Patented Dec. 15, 1953

2,662,903

UNITED STATES PATENT OFFICE 2,662,903

HALOGENATION PROCESS

Roman P. Holysz, Jr., and J Allan Campbell, Kalamazoo, Mich., assignors to The Upjohn Company, Kalamazoo, Mich., a corporation of Michigan No Drawing. Application July 16, 1952,
Serial No. 299,224

15 Claims. (Cl. 260—397.4)

The present invention relates to a halogenation process and is more particularly concerned with a novel process for the halogenation of 17α-hydroxypregnanes, having a ketone group at the 3-position.

It is an object of the present invention to provide a novel process for the halogenation of 17α-hydroxypregnanes, having a ketone group at position 3, and preferably at positions 3 and 20. A more specific object of the present invention is the provision of an improved process for the halogenation, at the 4-position, of 17α-hydroxy-21-acyloxypregnane-3,11,20-trione. Other objects of the present invention will be apparent to those skilled in the art to which this invention pertains.

The process of the present invention provides a new and superior method for accomplishing one of the steps in the synthesis of the physiologically active steroid hormone, cortisone. A review of the prior art reveals that the final stage in the commercial production of cortisone and its esters is the establishment of the double bond at the 4(5)-position of the steroid nucleus. This has been accomplished by bromination, at the 4-position, of 17α-hydroxy-21-acetoxypregnane-3,11,20-trione, followed by dehydrobromination to form the 4(5)-double bond and yield cortisone acetate. Obviously the success of this final stage is dependent to a large degree on the halogenation step and the resulting yield and purity of the 4-bromo compound. The prior art is in agreement that high state of purity of the 4-halo compound is essential in order for the dehydrohalogenation step to be successful to any degree of practicality. Gallagher and coworkers [J. Biol. Chem., 184, 394 (1950)], in referring to 4-bromo-17α-hydroxy-21-acetoxypregnane-3,11,20-trione, state that "rigorous purification of the 4-bromo ketone was essential in order to obtain a uniform dehydrohalogenation product in good yields." Mattox and Kendall [J. Biol. Chem., 188, 291 (1951)] state that 4-bromo-17α-hydroxy-21-acetoxypregnane-3,11,20-trione having a rotation of $[\alpha]_D$ plus 99 degrees (acetone) or higher is satisfactory for the dehydrohalogenation step. In respect to the yields of the halogenation reaction, the prior art procedures are somewhat vague. In the bromination of 17α-hydroxy-21-acetoxypregnane-3,11,20-trione to yield 4-bromo-17α-hydroxy-21-acetoxypregnane-3,11,20-trione, Sarett (U. S. Patent 2,541,104) does not state any yield. Likewise, Kendall and Mattox (U. S. Patent 2,590,978), in the preparation of the same compound, give the yield of only the crude product having a rotation of $[\alpha]_D$ plus 92 degrees (acetone), which required two recrystallizations before a product of acceptable purity [$[\alpha]_D$ plus 100 degrees (acetone)] could be obtained. The best yields for the preparation of 4-bromo-17α-hydroxy-21-acetoxypregnane-3,11,20-trione are those reported by Mattox and Kendall in J. Biol. Chem., 188, 287 (1951). In this preparation, 17α-hydroxy-21-acetoxypregane-3,11,20-trione was brominated with bromine in acetic acid to yield 4-bromo-17α-hydroxy-21-acetoxypregnane-3,11,20-trione in a crude yield of 89 per cent. Purification of this material by trituration with acetone-ether gave, in two crops, a total yield of 76 per cent of acceptable material; $[\alpha]_D$ plus 102 degrees and $[\alpha]_D$ plus 99 degrees (acetone).

In our hands the yields reported by Mattox and Kendall could not be realized. Diligent effort to reproduce these results, following the procedure exactly as reported, have consistently given yields lower than sixty per cent of acceptable 4-bromo-17α-hydroxy-21-acetoxypregnane - 3,11,20-trione. Such difficulty has also been experienced by other competent chemists, such as, for instance, Gallagher and co-workers, who in using essentially the procedure of Mattox and Kendall, state [J. Am. Chem. Soc., 74, 486 (1952)] that the yield of pure 4-bromo-17α-hydroxy-21-acetoxypregnane-3,11,20-trione in several experiments was from fifty to sixty per cent. The desirability of a procedure, whereby high yields of the important 4-halo-17α-hydroxy - 21 - acyloxypregnane-3,11,20-triones of requisite purity to be used effectively in a subsequent dehydrohalogenation step can be consistently obtained, is obvious.

In our efforts to improve this important step, we have discovered that the halogenation of 17α-hydroxy - 3 - ketopregnanes, especially 17α-hydroxy-21-acetoxypregnane-3,11,20-trione, when conducted in the presence of a N,N-dialkylacylamide consistently results in much improved yields and gives a product of high degree of purity. Yields of seventy to eighty per cent are consistently obtained and yields of ninety per cent are not unusual. The purity of the product is of such a high degree that purification is not necessary. Rotations of better than $[\alpha]_D$ plus 100 degrees (acetone) and as high as $[\alpha]_D$ plus 110 degrees (acetone) are always obtained. An improvement of the yield in the halogenation step from sixty to eighty per cent represents an increase of about 33 per cent in the amount of halo compound obtained. Such an improvement, and particularly as applied to one of the final steps in the commercial production of cortisone, is of significant economical value.

Starting materials for the process of the present invention are the 17α-hydroxy-3-ketopregnanes, preferably the 17α-hydroxy-3,20-diketopregnanes, and 17α-hydroxy-21-acyloxypregnane-3,11,20-triones represented by the formula:

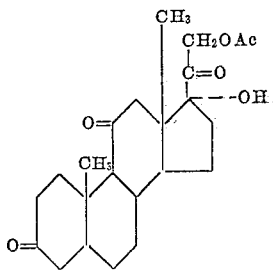

wherein Ac is the acyl radical of an organic carboxylic acid, especially such acids containing from one to eight carbon atoms, inclusive. Among the acids from which the acyl radical may be derived are formic, acetic, propionic, butyric, valeric, hexanoic, heptanoic, octanoic, cyclopentanoic, cyclohexanoic, benzoic, toluic, phenylacetic, trimethylacetic, cyclopentylpropionic, and the like. Preferred acids are the lower-aliphatic acids. The acids may also contain substituents, such as halo, alkyl, and methoxy, which are non-reactive under the conditions of reaction employed. The 17α-hydroxy-21-acryloxypregnane-3,11,20-triones utilized as starting materials for the present invention may be prepared according to procedures known in the art (Sarett, U. S. Patent 2,541,104). Representative other 17α-hydroxy-3-ketopregnanes include 17α,21-dihydroxypregnane-3,11,20-trione, 17α-hydroxypregnane-3,11,20-trione, 17α-hydroxypregnane-3,11,20-trione, 17α-hydroxypregnane-3,20-dione, 17α,11α-dihydroxypregnane-3,20-dione, 17α,11β-dihydroxypregnane-3,20-dione, 17α-hydroxy-11α-acetoxypregnane-3,20-dione, 17α-hydroxy-20,21-diacetoxypregnane-3-one, and the like.

According to the process of the present invention a 17α-hydroxy-3-ketopregnane, preferably a 17α-hydroxy-3,20-diketopregnane and especially a 17α-hydroxy-21-acyloxypregnane-3,11,20-trione is halogenated, in a N,N-dialkylacylamide, to yield a 4-halo-17α-hydroxy-21-acyloxypregnane-3,11,20-trione. The halogenating agent is a halogen of atomic weight between 35 and 80, consisting of chlorine and bromine. In carrying out the process of the present invention a 17α-hydroxy-21-acyloxypregnane-3,11,20-trione is dissolved in a N,N-dialkylacylamide and to this solution is added the halogen, either as such or as a solution in the same solvent. The product precipitates from the reaction mixture and is conveniently isolated by filtration. If precipitation does not take place directly, addition of water will cause the product to precipitate. The halogenation is conveniently conducted at room temperature, but temperatures of about zero to about 100 degrees centigrade are operative, with a temperature of about zero to about forty degrees centigrade being preferred. The halogen may be added in one portion, but preferably the addition is dropwise in order to avoid any large excess of the halogen in the reaction mixture. In this way each drop is added as soon as the previous drop has reacted as indicated by the loss of color. Consequently the reaction period is wholly dependent on the reactivity of the steroid and the amount of halogen employed. Reaction periods of a few minutes to several hours are operative. The preferred molar ratio of steroid to halogen is one mole of steroid to about 1.0 to 1.3 moles of halogen. If a smaller amount of halogen is used, it will be insufficient to complete the halogenation, whereas if much more than about 1.3 moles of halogen to one mole of steroid is used, undesirable polyhalogenated products may be formed. The preferred N,N-dialkylacylamide for the reaction is N,N-dimethylformamide but other dialkylacylamides such as, for example, N,N-dimethylpropionamide, N,N-dimethylacetamide, N,N-dimethylbutyramide, N,N-dimethylvaleramide, N,N-dimethylcaproamide, N,N-dimethylcaprylamide, N,N-diethylformamide, N,N-diethylacetamide, N-methyl-N-ethylformamide, N-methyl-N-ethylacetamide, N,N-dipropylacetamide, and the like are operative. Such preferred N,N-dialkylacylamides are of the formula

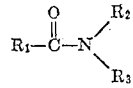

wherein $R_1$, $R_2$, and $R_3$ are lower alkyl radicals. The N,N-dialkylacylamides generally used are liquids, but if it is desired to use a N,N-dialkylacylamide, which is a solid, a solvent which is non-reactive under the conditions of the reaction, for example, acetic acid, may be employed.

Sometimes an acid catalyst is added to the reaction mixture as an aid in the reaction and to enhance the yield of product. For this purpose para-toluenesulfonic acid, naphthalenesulfonic acid, sulfuric acid, and the like may be used. Para-toluene-sulfonic acid is usually the preferred acid catalyst.

The following examples illustrate the process and products of the present invention, but are not to be construed as limiting.

*Example 1.—4-bromo-17α-hydroxy-21-acetoxypregnane-3,11,20-trione*

A solution of 320 milligrams (2.0 millimoles) of bromine in 3.2 milliliters of dimethylformamide was added dropwise to a solution of 809 milligrams (2.0 millimoles) of 17α-hydroxy-21-acetoxypregnane-3,11,20-trione and sixteen milligrams of para-toluenesulfonic acid in 6.8 milliliters of dimethylformamide. During addition, which required about three hours, the reaction was stirred and kept at room temperature. When approximately one-fourth of the bromine solution had been added, 4-bromo-17α-hydroxy-21-acetoxypregnane-3,11,20-trione began to crystallize out of the reaction mixture. When addition of the bromine solution was complete, five milliliters of water was added dropwise over a period of thirty minutes, the mixture cooled, filtered and the product washed with two-milliliter portions of cold water, ethanol, and ether, respectively. The yield of 4-bromo-17α-hydroxy-21-acetoxypregnane-3,11,20-trione was 0.748 grams (77.5 per cent); melting point 201 degrees centigrade (with decomposition); $[\alpha]_D$ plus 110 degrees (acetone).

*Analysis.*—Per cent calculated for $C_{23}H_{31}O_6Br$: Br, 16.5. Found: Br, 15.5.

*Example 2.—4-bromo-17α-hydroxy-21-acetoxypregnane-3,11,20-trione*

Following the procedure described in Example 1, 9.30 grams (23 millimoles) of 17α-hydroxy-21-acetoxypregnane-3,11,20-trione was brominated to yield 4 - bromo - 17α - hydroxy-21-acetoxypregnane-3,11,20-trione. The yield was 9.25 grams (83 per cent); melting point 198 degrees centigrade (with decomposition); [α]$_D$ plus 106 degrees (acetone).

Analysis.—Per cent calculated for $C_{23}H_{31}O_6Br$: Br, 16.5. Found: Br, 15.8.

Example 3.—4-bromo-17α-hydroxy-21-acetoxypregnane-3,11,20-trione

A solution consisting of 1.01 grams (2.5 millimoles) of 17α - hydroxy - 21 - acetoxypregnane-3,11,20-trione and 0.40 gram (2.5 millimoles) of bromine, in thirteen milliliters of dimethylformamide was allowed to stand at room temperature. After 3.5 hours, crystals began to form and after five hours all of the bromine had reacted as indicated by the loss of color in the solution. The crystals were filtered, washed with water and dried to yield 0.56 gram (46.3 per cent) of product; melting point 194 to 195 degrees centigrade (with decomposition); [α]$_D$ plus 103 degrees (acetone). The filtrate was diluted with 6.5 milliliters of water and cooled to yield an additional 0.32 gram (26.5 per cent) of product; melting point 197 to 198 degrees centigrade (with decomposition); [α]$_D$ plus 100 degrees (acetone). The total yield of 4-bromo-17α-hydroxy-21-acetoxy-pregnane-3,11,20-trione was 72.8 per cent.

Example 4.—4 - chloro - 17α - hydroxy - 21 - acetoxypregnane - 3,11,20 - trione

17α - hydroxy - 21 - acetoxypregnane - 3,11,20-trione (0.404 gram; 0.001 mole) was dissolved in five milliliters of dimethylformamide and a few crystals of para-toluenesulfonic acid were added. A chlorine solution was prepared by bubbling about 0.9 gram of gaseous chlorine into 25 milliliters of ice-cold dimethylformamide, resulting in a chlorine concentration, as determined by titration, of 1.04 N. To the solution containing the steroid, while being stirred with a magnetic stirrer, was added dropwise 2.3 milliliters (0.00120 mole) of the chlorine solution. Each drop was allowed to decolorize before the next was added, and the addition required about seven minutes. The reaction mixture was then diluted with fifty milliliters of water and cooled. The precipitate which formed was collected, washed with water and dried. The yield of 4-chloro-17α - hydroxy - 21 - acetoxypregnane - 3,11,20 - trione was 0.401 gram (91 per cent); melting point 227 to 231 degrees centigrade; [α]$_D$ plus 100 degrees (acetone).

Example 5.—4 - bromo - 17α - hydroxy - 21 - propionyloxypregnane - 3,11,20 - trione Following the procedure given in Examples 1, 2, and 3, 4-bromo-17α-hydroxy-21-propionyloxypregnane-3,11,20-trione is prepared in high yield and purity by bromination of 17α-hydroxy-21-propionyloxypregnane-3,11,20-trione with bromine in N,N-diethylformamide.

Example 6.—4 - bromo - 17α - hydroxy - 21 - benzoyloxypregnane - 3,11,20 - trione Following the procedure given in Examples 1, 2, and 3, 4-bromo-17α-hydroxy-21-benzoyloxypregnane-3,11,20-trione is prepared in high yield and purity by bromination of 17α-hydroxy-21-benzoyloxypregnane-3,11,20-trione with bromine in N,N-dimethylacetamide.

Example 7.—4 - bromo - 17α - hydroxy - 21 - octanoyloxypregnane - 3,11,20 - trione Following the procedure given in Examples 1, 2, and 3, 4-bromo-17α-hydroxy-21-octanoyloxypregnane-3,11,20-trione is prepared in high yield and purity by bromination of 17α-hydroxy-21 - octanoyloxypregnane - 3,11,20 - trione with bromine in N,N - diethylacetamide.

Example 8.—4 - chloro - 17α - hydroxy - 21 - butyroyloxypregnane - 3,11,20 - trione Following the procedure given in Example 4, 4 - chloro - 17α - hydroxy - 21 - butyroyloxypregnane-3,11,20-trione is prepared in high yield and purity by chlorination of 17α-hydroxy-21-butyroyloxypregnane-3,11,20-trione with chlorine in N-methyl-N-ethylformamide.

Example 9.—4 - chloro - 17α - hydroxy - 21 - pentanoyloxypregnane - 3,11,20 - trione Following the procedure given in Example 4, 4 - chloro - 17α - hydroxy - 21 - pentanoyloxypregnane - 3,11,20 - trione is prepared in high yield and purity by chlorination of 17α-hydroxy-21 - pentanoyloxypregnane - 3,11,20 - trione with chlorine in N-methyl-N-ethylacetamide.

Example 10.—4 - bromo - 17α - hydroxypregnane - 3,11,20 - trione

Following the procedure given in Examples 1, 2, and 3, 4-bromo-17α-hydroxypregnane- 3,11,20-trione is prepared in high yield and purity by bromination of 17α - hydroxypregnane - 3,11,20-trione with bromine in N,N-dimethylacetamide.

Example 11.—4 - chloro - 17α - hydroxypregnane - 3,20 - dione

Following the procedure given in Example 4, 4 - chloro - 17α - hydroxypregnane - 3,20 - dione is prepared in high yield and purity by chlorination of 17α - hydroxypregnane - 3,20 - dione with chlorine in N,N - dimethylformamide.

Following the procedure given in the above examples, the process of the present invention may be employed to prepare still other 4 - halo - 17α - hydroxy - 21 - acyloxypregnane - 3,11,20 - triones such as, for example, 4-bromo-17α-hydroxy - 21 - butyroyloxypregnane - 3,11,20 - trione, 4 - bromo - 17α - hydroxy - 21 - pentanoyloxypregnane - 3,11,20 - trione, 4 - bromo - 17α - hydroxy - 21 - hexanoyloxypregnane - 3,11,20 - trione, 4 - bromo - 17α - hydroxy - 21 - heptanoyloxypregnane - 3,11,20 - trione, 4 - bromo - 17α - hydroxy - 21 - trimethylacetoxypregnane - 3,11,20 - trione, the corresponding 4-chloro compounds, and the like. Other representative products produced from the corresponding selected starting material include 4-chloro - 17α,21 - dihydroxypregnane - 3,11,20 - trione, 4 - chloro - 17α,11α - dihydroxypregnane - 3,20 - dione, 4 - chloro - 21 - acetoxy - 17α,11β - dihydroxypregnane - 3,20 - dione, 4 - chloro - 17α - hydroxy - 11α - acetoxypregnane - 3,20 - dione, 4 - chloro - 17α - hydroxy - 20,21 - diacetoxypregnane - 3 - one, the corresponding 4-bromo compounds, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. In a process for the halogenation of a 17α- hydroxy-3-ketopregnane to introduce a halogen atom into the 4-position thereof by reacting the 17α-hydroxy-3-ketopregnane with a halogen of atomic weight from 35 to 80, the step of conducting the halogenation in the presence of a N,N-dialkylacylamide.

2. In a process for the halogenation of a 17α-hydroxy-3,20-diketopregnane to introduce a halogen atom into the 4-position thereof by reacting the 17α-hydroxy-3,20-diketopregnane with a halogen of atomic weight from 35 to 80, the step of conducting the halogenation in the presence of a N,N-dialkylacylamide.

3. In a process for the halogenation of a 17α-hydroxy-3,20-diketopregnane to introduce a halogen atom into the 4-position thereof by reacting the 17α-hydroxy-3,20-diketopregnane with a halogen of atomic weight from 35 to 80, the step of conducting the halogenation in the presence of a N,N-dialkylacylamide of the formula

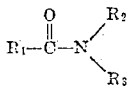

wherein $R_1$, $R_2$, and $R_3$ are lower alkyl radicals.

4. In a process for the halogenation of a 17α-hydroxy-3,20-diketopregnane to introduce a halogen atom into the 4-position thereof by reacting the 17α-hydroxy-3,20-diketopregnane with a halogen of atomic weight from 35 to 80, the step of conducting the halogenation in the presence of N,N-dimethylformamide.

5. A process for the production of a 4-halo-17α-hydroxy-21 - acyloxypregnane - 3,11,20 - trione which includes: reacting together a 17α-hydroxy-21-acyloxypregnane-3,11,20-trione, wherein the acyloxy group has the formula AcO, Ac being the acyl radical of an organic carboxylic acid containing from one to eight carbon atoms, inclusive, and a halogen of atomic weight from 35 to 80, in the presence of a N,N-dialkylacylamide.

6. A process for the production of a 4-halo-17α-hydroxy-21 - acyloxypregnane - 3,11,20 - trione which includes: reacting together, in the presence of a N,N-dialkylacylamide of the formula

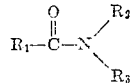

wherein $R_1$, $R_2$, and $R_3$ are lower alkyl radicals, a 17α-hydroxy-21-acyloxypregnane-3,11,20 - trione, wherein the acyloxy group has the formula AcO, Ac being the acyl radical of an organic carboxylic acid containing from one to eight carbon atoms, inclusive, and a halogen of atomic weight from 35 to 80.

7. A process for the production of a 4-halo-17α-hydroxy-21 - acyloxypregnane - 3,11,20 - trione which includes: reacting together, in the presence of a N,N-dialkylacylamide of the formula

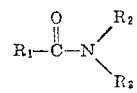

wherein $R_1$, $R_2$, and $R_3$ are lower alkyl radicals, and at a ratio of one mole of steroid to about 1.0 to 1.3 moles of halogen, a 17α-hydroxy-21-acyloxypregnane-3,11,20-trione, wherein the acyloxy group has the formula AcO, Ac being the acyl radical of an organic carboxylic acid containing from one to eight carbon atoms, inclusive, and a halogen of atomic weight from 35 to 80.

8. A process for the production of a 4-halo-17α-hydroxy-21 - acyloxypregnane - 3,11,20 - trione which includes: reacting together, in the presence of a N,N-dialkylacylamide of the formula

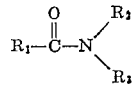

wherein $R_1$, $R_2$, and $R_3$ are lower alkyl radicals, and at a ratio of one mole of steroid to about 1.0 to 1.3 moles of halogen, a 17α-hydroxy-21-acyloxypregnane-3,11,20-trione, wherein the acyloxy group has the formula AcO, Ac being the acyl radical of an organic carboxylic acid containing from one to eight carbon atoms, inclusive, and a halogen of atomic weight from 35 to 80; the reaction being conducted at a temperature between about zero and forty degrees centigrade.

9. A process for the production of a 4-halo-17α-hydroxy-21 - acyloxypregnane - 3,11,20 - trione which includes: reacting together, in the presence of a N,N-dialkylacylamide of the formula

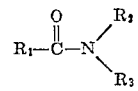

wherein $R_1$, $R_2$, and $R_3$ are lower alkyl radicals, and at a ratio of one mole of steroid to about 1.0 to 1.3 moles of halogen, a 17α-hydroxy-21-acyloxypregnane-3,11,20-trione, wherein the acyloxy group has the formula AcO, Ac being the acyl radical of an organic carboxylic acid containing from one to eight carbon atoms, inclusive, and a halogen of atomic weight from 35 to 80; the reaction being conducted at a temperature between about zero and forty degrees centigrade and in the presence of an acid catalyst.

10. A process for the production of a 4-halo-17α-hydroxy-21-acyloxypregnane-3,11,20 - trione which includes: reacting together, in the presence of a N,N-dialkylacylamide of the formula

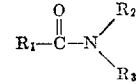

wherein $R_1$, $R_2$, and $R_3$ are lower alkyl radicals and at a ratio of one mole of steroid to about 1.0 to 1.3 moles of halogen, a 17α-hydroxy-21-acyloxypregnane-3,11,20-trione, wherein the acyloxy group has the formula AcO, Ac being the acyl radical of an organic carboxylic acid containing from one to eight carbon atoms, inclusive, and a halogen of atomic weight from 35 to 80; the reaction being conducted at a temperature between about zero and forty degrees centigrade and in the presence of para-toluenesulfonic acid.

11. A process for the production of a 4-halo-17α-hydroxy-21-acyloxypregnane-3,11,20 - trione which includes: reacting together, in the presence of N,N-dimethylformamide and at a ratio of one mole of steroid to about 1.0 to 1.3 moles of halogen, a 17α-hydroxy-21-acyloxypregnane-3,11,20 - trione, wherein the acyloxy group has the formula AcO, Ac being the acyl radical of an organic carboxylic acid containing from one to eight carbon atoms, inclusive, and a halogen of atomic weight from 35 to 80; the reaction being conducted at a temperature between about zero and forty degrees centigrade.

12. A process for the production of a 4-bromo-17α - hydroxy-21-acyloxypregnane-3,11,20-trione which includes: reacting together, in the presence of a N,N-dialkylacylamide of the formula

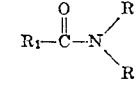

wherein $R_1$, $R_2$, and $R_3$ are lower alkyl radicals, and at a ratio of one mole of steroid to about 1.0 to 1.3 moles of bromine, a 17α-hydroxy-21-acyloxypregnane-3,11,20-trione, wherein the acyloxy group has the formula AcO, Ac being the acyl radical of a monocarboxylic hydrocarbon acid containing from one to eight carbon atoms, inclusive, and bromine; the reaction being conducted at a temperature between about zero and about forty degrees centrigrade.

13. A process for the production of a 4-chloro-17α - hydroxy-21-acyloxypregnane-3,11,20-trione which includes: reacting together, in the presence of a N,N-dialkylacylamide of the formula

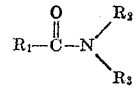

wherein $R_1$, $R_2$, and $R_3$ are lower alkyl radicals, and at a ratio of one mole of steroid to about 1.0 to 1.3 moles of chlorine, a 17α-hydroxy-21-acyloxypregnane-3,11,20-trione, wherein the acyloxy group has the formula AcO, Ac being the acyl radical of a monocarboxylic hydrocarbon acid containing from one to eight carbon atoms, inclusive, and chlorine; the reaction being conducted at a temperature between about zero and about forty degrees centigrade.

14. A process for the production of 4-bromo-17α - hydroxy-21-acetoxypregnane-3,11,20-trione which includes: reacting together, in the presence of N,N-dimethylformamide and at a ratio of one mole of steroid to about 1.0 to 1.3 moles of bromine, 17α - hydroxy - 21 - acetoxypregnane-3,11,20-trione and bromine; the reaction being conducted at a temperature of about zero to about forty degrees centigrade.

15. A process for the production of 4-chloro-17α - hydroxy-21-acetoxypregnane-3,11,20-trione which includes: reacting together, in the presence of N,N-dimethylformamide and at a ratio of one mole of steroid to about 1.0 to 1.3 moles of chlorine, 17α - hydroxy - 21 - acetoxypregnane-3,11,20-trione and chlorine; the reaction being conducted at a temperature of about zero to about forty degrees centigrade.

ROMAN P. HOLYSZ, JR.
J ALLAN CAMPBELL.

No references cited